(12) United States Patent
Snow, Jr. et al.

(10) Patent No.: US 7,322,546 B2
(45) Date of Patent: Jan. 29, 2008

(54) PERFORMANCE AIRPLANE WING WITH TIP TANK ASSEMBLY

(76) Inventors: Harry T. Snow, Jr., 941 Bryn Mawr Dr., Gahanna, OH (US) 43230; Ralph E. Alden, 380 Sycamore Woods La., Gahanna, OH (US) 43230

( * ) Notice: Subject to any disclaimer, the term of this patent is extended or adjusted under 35 U.S.C. 154(b) by 57 days.

(21) Appl. No.: 11/244,897

(22) Filed: Oct. 6, 2005

(65) Prior Publication Data

US 2006/0076460 A1    Apr. 13, 2006

Related U.S. Application Data

(60) Provisional application No. 60/616,958, filed on Oct. 7, 2004.

(51) Int. Cl.
  *B64G 1/00* (2006.01)
(52) U.S. Cl. .............. 244/172.3; 244/135 R; 244/199.4
(58) Field of Classification Search ............ 244/135 R, 244/172.2, 172.3, 130, 199.2, 199.4
See application file for complete search history.

(56) References Cited

U.S. PATENT DOCUMENTS

| | | | |
|---|---|---|---|
| 2,416,104 A | | 2/1947 | Lerche |
| 2,421,699 A | | 6/1947 | Johnson |
| 2,505,604 A | | 4/1950 | Clark et al. |
| 2,514,888 A | * | 7/1950 | McFarland .............. 244/135 R |
| 2,537,369 A | | 1/1951 | Ostroff |
| 2,547,226 A | | 4/1951 | Michael |
| 2,550,380 A | * | 4/1951 | Redford ................. 244/135 R |
| 2,575,534 A | * | 11/1951 | Stoughton .............. 244/135 R |
| 2,591,913 A | * | 4/1952 | Bowers et al. .......... 244/135 R |
| 2,665,862 A | | 1/1954 | Grill |
| 2,681,192 A | | 6/1954 | Pappas |
| 2,764,374 A | | 9/1956 | Anderson et al. |
| 2,955,787 A | * | 10/1960 | Ray et al. ............... 244/135 R |
| 2,984,439 A | * | 5/1961 | Fletcher ................. 244/130 |
| 3,098,632 A | | 7/1963 | Christenson |
| 6,491,255 B1 | * | 12/2002 | Bracken et al. ......... 244/135 R |

OTHER PUBLICATIONS

Jun, Seungmoon. "An Aeroelastic Analysis of the ICW Model with External Stores", Agency for Defense Devlopment, Taejon, Korea, Oct. 24, 2003.
"Wings for All Speeds", *Advanced Topics in Aerodynamics*, Copyright: A. Filippone (1999-2004) http://www.aerodyn.org/Drag/tip_devices.html.

* cited by examiner

*Primary Examiner*—Troy Chambers
*Assistant Examiner*—Benjamin P. Lee
(74) *Attorney, Agent, or Firm*—Fay Sharpe LLP

(57) ABSTRACT

The present development relates to an improved wing having a tip tank assembly. The tip tank assembly is attached to a distal end of an outer wing section. The tip tank assembly includes a tank, a pair of mounting brackets and a fairing assembly. The fairing assembly includes a nose piece, a central piece, a tail piece, an inner end plate, and an upper close out piece. The inner end plate extends perpendicularly downward from a lower surface of the outer wing section eventually terminating at a bottom portion of the central piece. The inner end plate acts as an air dam to trap high pressure air that is generated during flight, substantially increasing the lift of the wing. Lastly, the upper close out piece extends between an upper wing surface and an upper portion of the central piece increasing the overall wingspan of the aircraft.

11 Claims, 6 Drawing Sheets

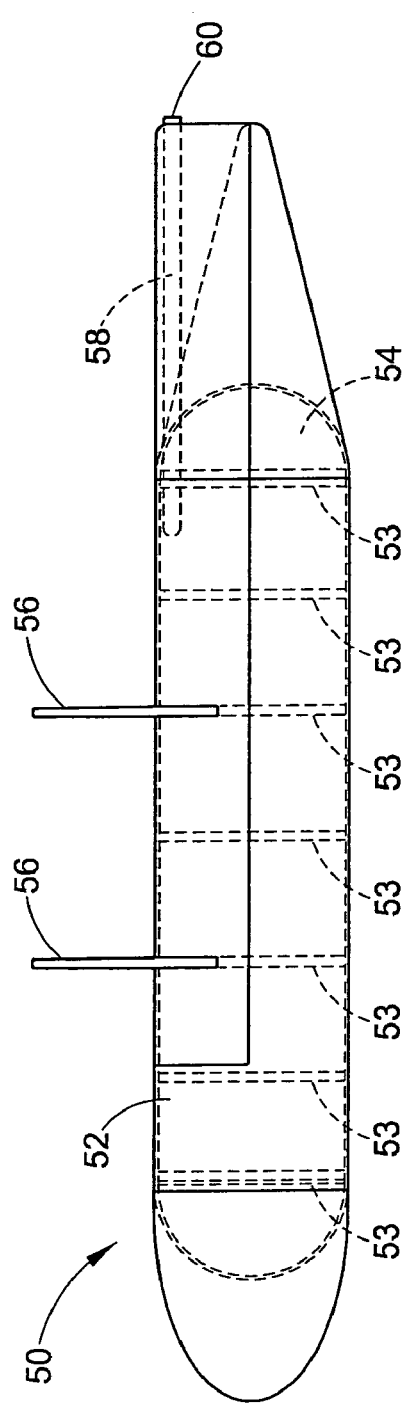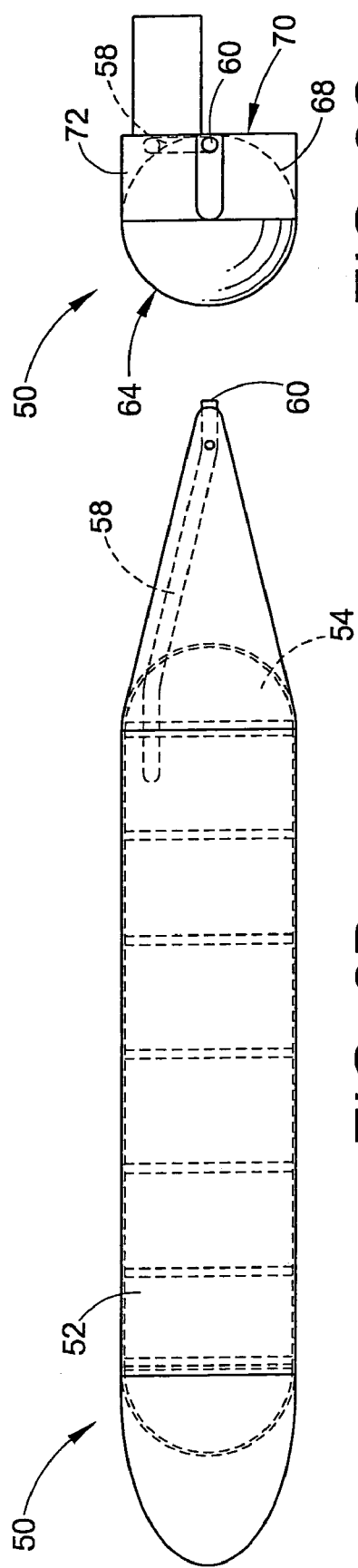

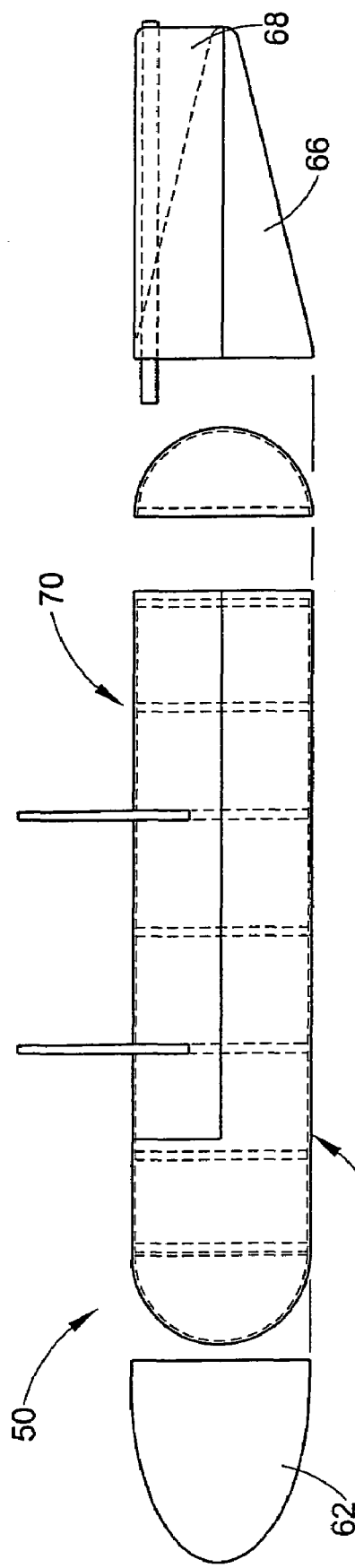
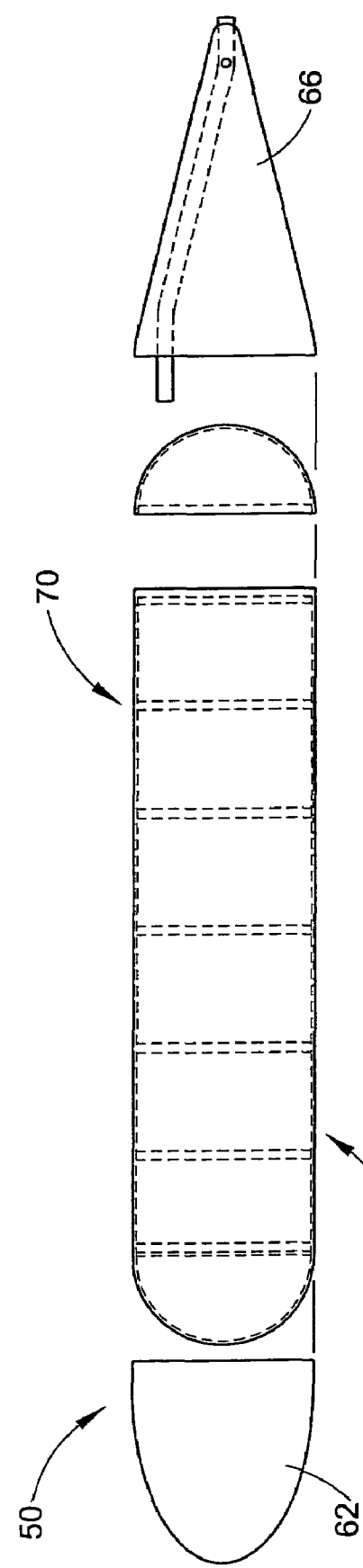

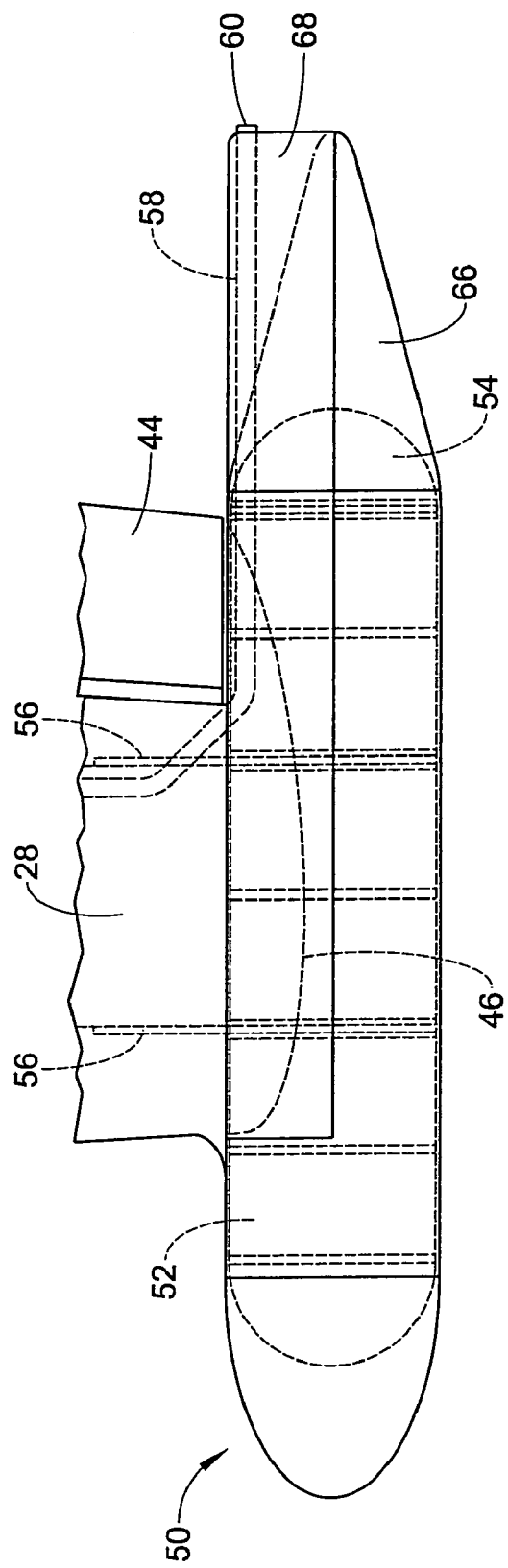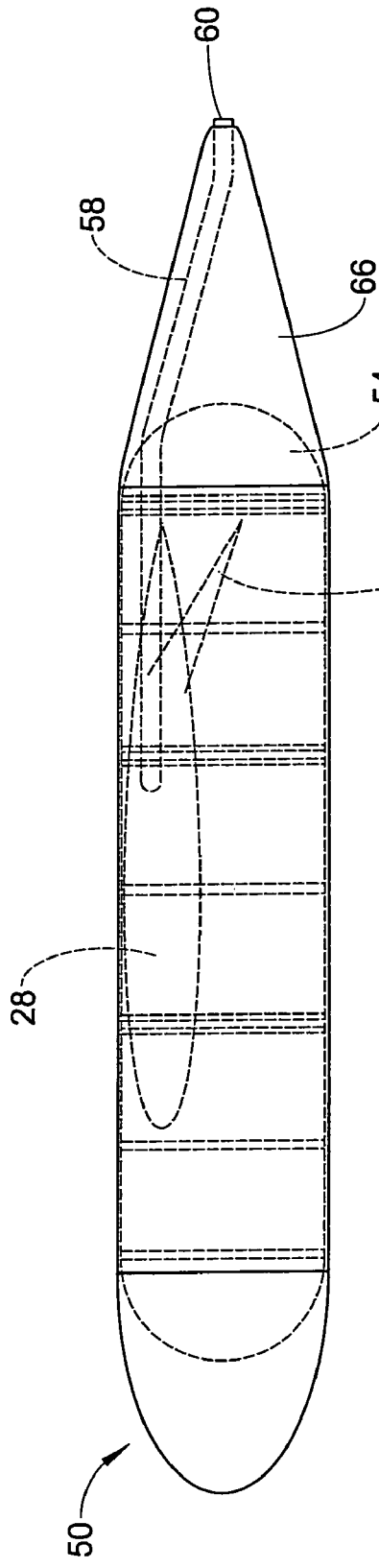

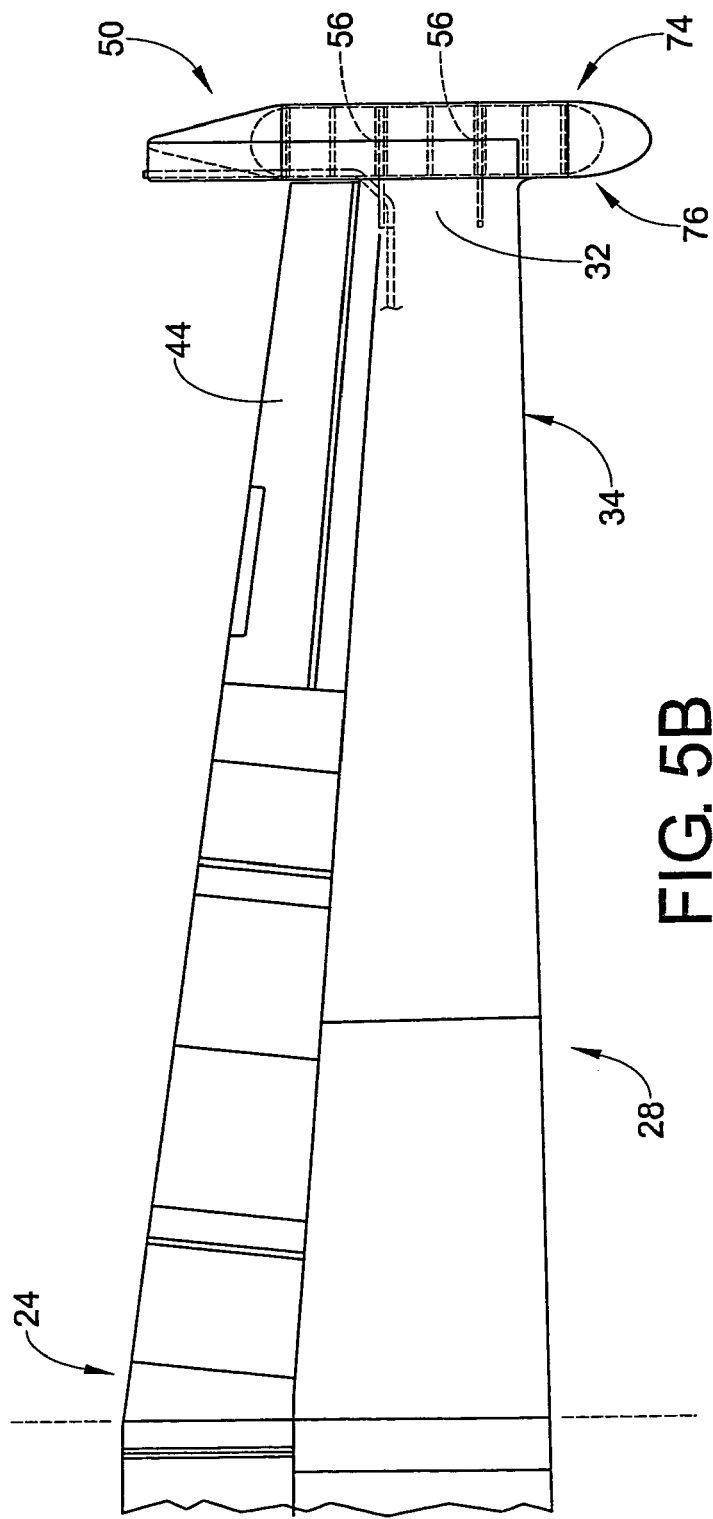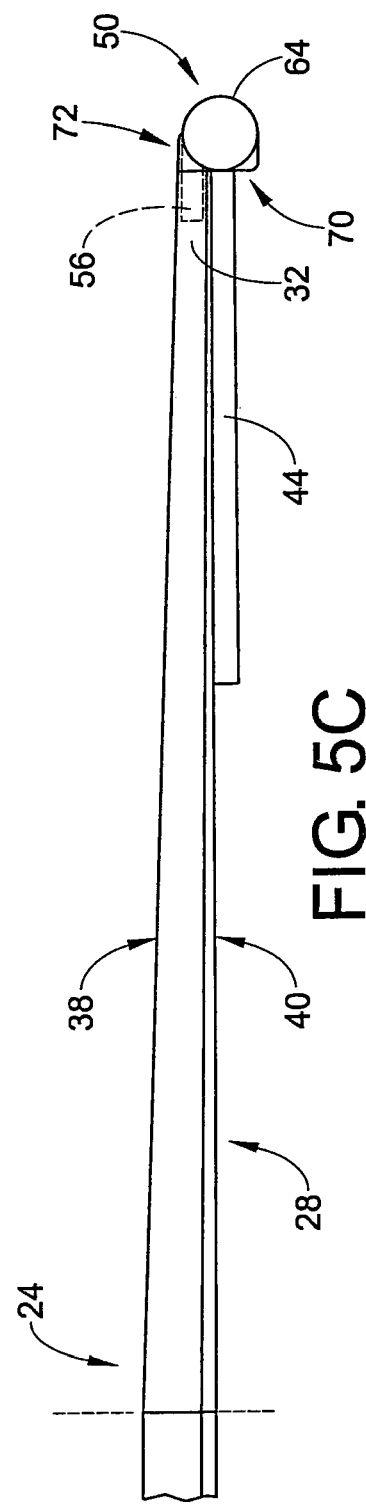

PERFORMANCE AIRPLANE WING WITH TIP TANK ASSEMBLY

This application claims the priority benefit of U.S. application Ser. No. 60/616,958, filed Oct. 7, 2004, the disclosure of which is incorporated herein by reference.

BACKGROUND

The present development relates to aircraft wing assemblies. It finds particular application in the field of wing tip assemblies that provide improved wing aerodynamics and or extended aircraft travel range.

Prior art wing assemblies involve tip designs that permit tanks or other mission component containers to be suspended at the distal end of a wing. In some cases the tank or container may be detachable during flight at the discretion of the flight crew. However, these prior art tip designs exhibit many disadvantages. One disadvantage involves the added drag that occurs from having a relatively large structure located on the wing of the aircraft in the wrong position that may result in lower climb and cruise speeds as well as reduced fuel economy. Another disadvantage involves the amount of lift that is available due to the location of the tank that may result in longer take off rolls and higher stall speeds compared to other designs. Still yet another disadvantage involves the generation of wing tip vortices and associated wake turbulence from previous tip tank or container designs.

It is therefore the object of the present development to provide an improved airplane wing having a wing tip tank assembly that decreases wing tip vortices yielding increased lift, lower stall speeds, and a longer flight range.

SUMMARY

According to one aspect, an aircraft includes a fuselage with a forward portion and an aft portion, and a first wing portion attached to the fuselage and extending in a starboard direction from the fuselage. The first wing portion includes an upper surface, a lower surface, a forward surface, and an aft surface. The first wing portion also includes a first cylindrical tip having a forward tip portion, an aft tip portion, and a cylindrical portion. The first cylindrical tip is disposed at a distal end of the first wing portion opposite the fuselage. The forward tip portion of the first cylindrical tip is in the general direction of the forward portion of the fuselage and the aft tip portion is in the general direction of the aft portion of the fuselage. The aircraft further includes a second wing portion attached to the fuselage and extending in a port direction from the fuselage. The second wing portion includes an upper surface, a lower surface, a forward surface, and an aft surface. The second wing portion also includes a second cylindrical tip having a forward tip portion, an aft tip portion, and a cylindrical portion. The second cylindrical tip is disposed at a distal end of the second wing portion opposite the fuselage. The forward tip portion of the second cylindrical tip is in the general direction of the forward portion of the fuselage and the aft tip portion in the general direction of the aft portion of the fuselage. In addition, an upper surface of the first cylindrical tip is generally level with the upper surface of the first wing portion and an upper surface of the second cylindrical tip is generally level with the upper surface of the second wing portion.

According to another aspect, a wing tip assembly for installation on a wing portion of an aircraft at a distal end of the wing portion, includes a forward tip portion, an aft tip portion, and a cylindrical portion. The forward tip portion is in the general direction of a forward portion of the aircraft and the aft tip portion in the general direction of an aft portion of the aircraft. In addition, an upper surface of the wing tip assembly is generally level with an upper surface of the wing portion. The wing tip assembly also includes an end plate fairing disposed along a center and aft side of the wing tip assembly. The end plate fairing is adapted to depend from the lower surface of the wing portion and extend toward a lower surface of the wing tip assembly. In addition, the end plate fairing includes a generally planar surface adapted to extend from the lower surface of wing portion and generally perpendicular to the lower surface of the wing portion. The wing tip assembly further includes a closeout fairing adapted to extend from the upper surface of the wing portion toward the upper surface of the wing tip assembly, a nose cone extending forward from the forward tip portion of the wing tip assembly, and a first tail cone extending aft from the aft tip portion of the wing tip assembly.

According to yet another aspect, a tip assembly is adapted to mount to a distal end of a wing of an aircraft, the wing having an upper surface and a lower surface, and the aircraft having a longitudinal axis extending from a forward portion to an aft portion. The tip assembly includes a central piece including a first end, a second end, an inner side portion, and an outer side portion. The tip assembly further includes a nose piece disposed at the first end of the central piece, a tail piece disposed at the second end of the central piece, and an inner end plate extending perpendicularly downward from the lower surface of the wing and adjacent the inner side portion of the central piece. Wherein, the nose piece, the tail piece, the inner end plate piece, and the outer side portion of the central piece form an aerodynamic surface.

BRIEF DESCRIPTION OF THE DRAWINGS

FIG. 2A is a lengthwise cross section as viewed from the top of the tip tank assembly illustrated in FIG. 1.

FIG. 2B is a cross sectional view from the side of the tip tank assembly of FIG. 2A.

FIG. 2C is a rear elevation view of the tip tank assembly illustrating a rear boat tail cone fairing and a fuel drain outlet of FIG. 2A.

FIG. 3A is an exploded cross sectional view of the tip tank assembly of FIG. 2A.

FIG. 3B is an exploded cross sectional view of the tip tank assembly of FIG. 2B.

FIG. 4A is a cross sectional view from the top of the tip tank assembly as installed on an outer wing section of the aircraft of FIG. 1.

FIG. 4B is a cross sectional view from the side of the tip tank assembly as installed on an outer wing section of the aircraft of FIG. 1.

FIG. 5B is a cross sectional view from the top of the outer wing section and the tip tank assembly as installed on the aircraft of FIG. 1.

FIG. 5C is a cross sectional view from the front of the outer wing section and the tip tank assembly as installed on the aircraft of FIG. 1.

DETAILED DESCRIPTION

Figure 1:
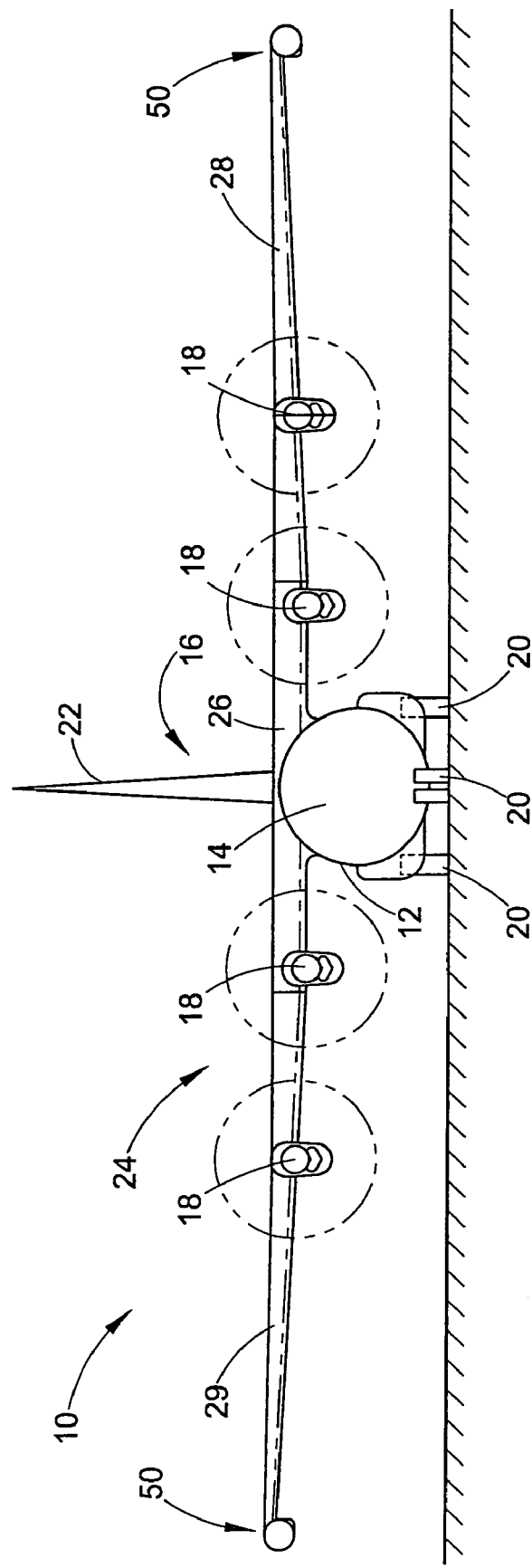
FIG. 1 is a front elevation view of an aircraft illustrating a tip tank assembly installed on each wing of the aircraft according to the present development.

With reference to FIG. 1, a front elevation view of an aircraft 10 incorporating one embodiment of the present development is illustrated. Generally, the aircraft 10 includes a fuselage 12 having a forward portion 14 and an aft portion 16. The aircraft 10 further includes one or more propulsion units 18, a nose and main landing gear assembly 20, a tail section 22 and a wing assembly 24. The wing assembly 24 includes an inner wing section 26, a port side outer wing section 28, and a starboard side outer wing section 29.

Figure 5A:
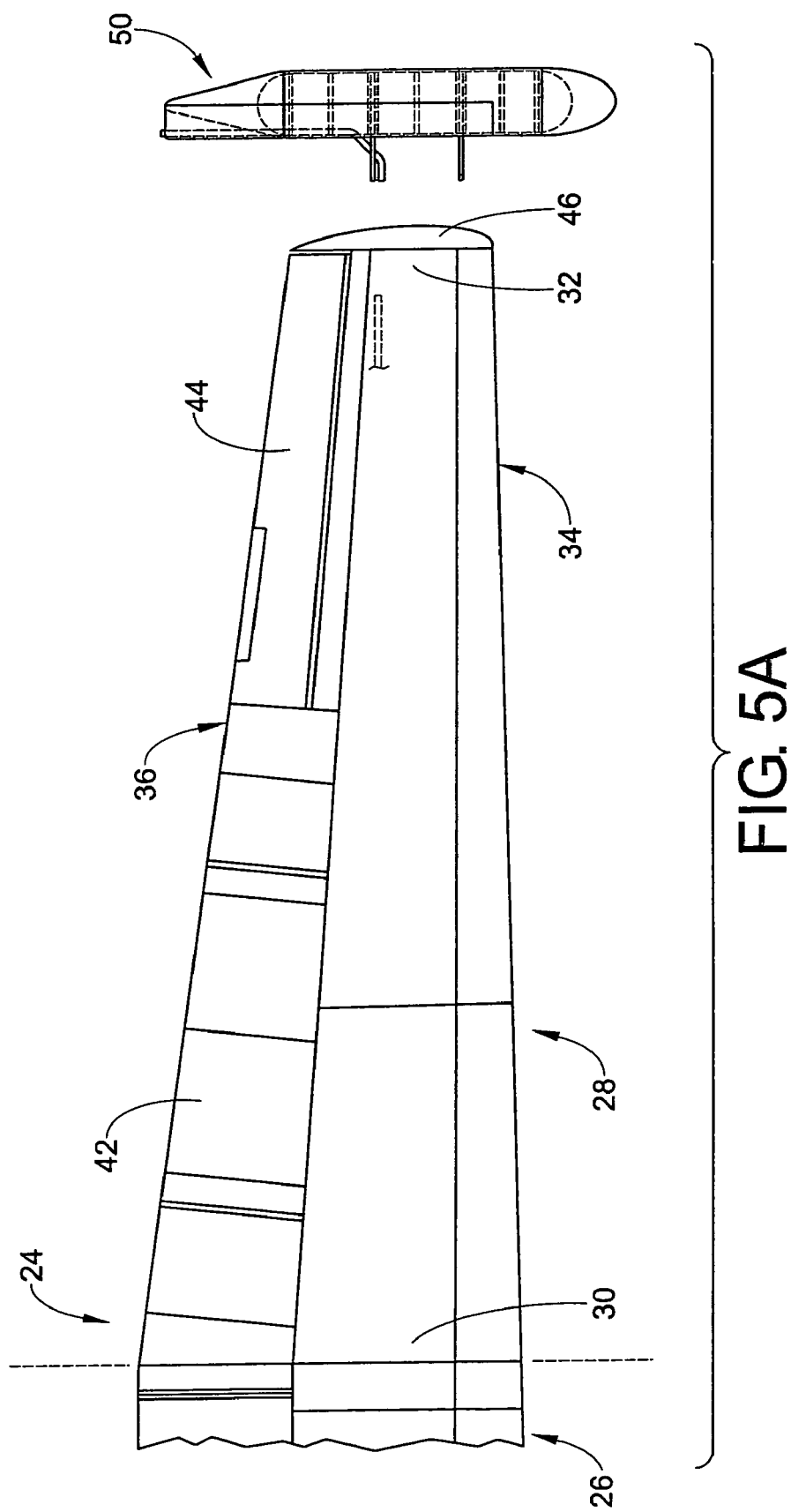
FIG. 5A is a cross sectional view from the top of the outer wing section and the tip tank assembly just prior to installation onto the aircraft of FIG. 1.

With reference now to FIGS. 5A-5C, the wing assembly 24 is illustrated in greater detail. In particular, FIG. 5A shows an enlarged cross sectional view of the port side outer wing section 28. Since the port side outer wing section 28 and the starboard side outer wing section 29 (FIG. 1) are structurally and functionally mirror images of each other, the following discussion is made primarily with reference to the port side outer wing section 28 to avoid redundancy. The port side outer wing section 28 is attached to the inner wing section 26 along a dashed reference datum. The outer wing section extends from a proximal end 30 to a distal end 32 of the outer wing section 28. Also, the outer wing section 28 includes a forward surface or leading edge 34, an aft surface or trailing edge 36, an upper surface 38 (FIG. 5C) and a lower surface 40 (FIG. 5C). With continued reference to FIG. 5A, the outer wing section 28 further includes a flap section 42, an aileron control surface 44, and a wing tip 46. With reference to FIG. 1, a tip tank assembly 50 is mounted on the distal end of both port and starboard outer wing sections 28, 29 while FIG. 5A illustrates the tip tank assembly 50 just prior to installation.

Now with reference to FIGS. 2A, 2B, and 2C, the tip tank assembly 50 is illustrated in a top, side, and rear view, respectively. The tip tank assembly 50 generally includes a tank 52 having a plurality of partitions 53, a removable end cap 54, a pair of mounting brackets 56 and a fuel drain extension 58. The tank 52 is generally cylindrical and provides additional storage for sensors, instrumentation, munitions, or fuel. In the present embodiment, each of the wing tip tanks 52 is intended to carry approximately 512 additional gallons of fuel. Since each outer wing section includes one tip tank assembly 50, as shown in FIG. 1, this would provide for an additional 1024 gallons of fuel. The partitions are of particular importance because they inhibit rapid movement of the fuel from one end of the tank 52 to the other induced by in flight maneuvers. Such rapid movement is undesirable in that it may cause the aircraft 10 to pitch or yaw suddenly rendering it temporarily unstable and creating a precarious situation for the pilots and passengers. Fuel is allowed to slowly drain from one partoned section of the tank 52 to another either by perforating the partitions or by linking the partitioned sections with low flow rate tubing.

With continued reference to FIGS. 2A, 2B, and 2C, the removable end cap 54 may include a threaded portion disposed about an opening of the end cap 54 for fastening it to the tank 52. Alternatively, the end cap 54 may use a series of bolted joints, clasps, and or gaskets about the circumference of the end cap 54 to secure it in a leak proof manner to the tank 52. The mounting brackets 56 may include a plurality of pre-drilled rivet holes or weld chamfers for attaching the mounting bracket 56 to a wing spar or other structural member of the outer wing section. Naturally, the mounting brackets 56 must be fabricated from an appropriate material that can endure various load forces generated during taxiing, take-off, steep banks, and landing of the aircraft. Lastly, the fuel drain extension 58 serves to redirect fuel flow away from the tip tank assembly. Most military aircraft and some civil aircraft include a means of jettisoning fuel in the case of an emergency. In some cases an existing fuel drain outlet is located near the wingtips of the craft. In such a case the installation of the tip tank assembly 50 would require a slight relocation of the existing fuel drain outlet. The fuel drain extension 58 of the present embodiment addresses this issue by locating a new fuel drain port 60 at a rear portion of the tip tank assembly 50.

With reference now to FIGS. 3A and 3B, the tip tank assembly 50 further includes a fairing assembly. The fairing assembly includes a nose piece 62, a central piece 64 and a conical tail piece 66. The fairing assembly may also include a flat tapered tail piece (that may resemble a "boat tail") 68, an inner end plate or end plate fairing 70, and an upper close out piece or close out fairing 72 (FIG. 2C). While one benefit of the tip tank assembly 50 involves storing additional fuel to increase the travel range of the aircraft 10, the primary benefit of the present embodiment of the tip tank assembly 50 is to enhance certain aerodynamic characteristics of the aircraft 10. The tip tank assembly 50 primarily aids in retaining or trapping high pressure airflow under the outer wing sections, thus increasing lift of the aircraft 10, and lowering the stall speeds. Generally, as the wing encounters the air during flight, one portion of the air travels over the upper surface of the wing while the other portion of the air travels adjacent to the lower surface of the wing. Due to the airfoil design of the wing, air traveling over the upper surface is at a lower relative pressure than the air traveling adjacent to the lower surface of the wing. This pressure differential causes a component of the higher pressure air along the lower surface of the wing to move outward towards the wing tip. Installation of the tip tank assembly 50 inhibits the outward flow of this high pressure air, retaining it under the lower wing surface to produce additional lift on the wing. Specifically, as shown with reference to FIGS. 2C, 3B, and 5A, the inner end plate 70 and the flat tapered tail piece 68, act as an air dam during flight to inhibit the high pressure airflow from moving in a transverse direction from the proximal end 30 to the distal end 32 and past the wing tip 46. By preventing this perpendicular or transverse air flow, the overall lift produced by the wing 28 is increased, while any induced or dynamic drag is kept at a minimum.

In addition, with continued reference to FIG. 5A, the tip tank assembly 50 also helps to reduce wing tip vortices and wake turbulence. Wing tip vortices are generated by the interaction of the lower air pressure air flow along the upper surface of the wing and the higher air pressure airflow along the lower surface of the wing. The reaction between the high pressure and low pressure airflows generates a vortex along the wing tip 46 of the aircraft 10. In particular, a swirling counter clockwise vortex is generated along the wing tip 46 of the port side outer wing section 28 (as viewed from the forward portion 14 of the aircraft 10). Likewise, a clockwise vortex is generated along the wing tip 46 of the starboard outer wing section 29 (as viewed from the forward portion 14 of the aircraft 10). In a similar manner as discussed previously, the interaction between the high pressure airflow and the low pressure airflow is inhibited due to the installation of the tip tank assembly 50. Therefore, a portion of the fluid energy lost in generating wing tip vortices is recovered by the use of the tip tank assembly 50 and is partially converted into a perpendicular upward force creating lift on the wing.

With reference to FIGS. 4A and 4B, the tip tank assembly 50 is now shown as installed on the outer wing portion 28. In order to install the tip tank assembly 50, the wing tip 46 must first be removed. The location of the wing tip 46 prior to removal is shown in a dashed line in FIG. 4A. In addition, the existing fuel drain must be slightly reconfigured to allow for emergency fuel dumping. The primary structural weight bearing elements are the tank 52 and the mounting brackets 56. The mounting brackets 56 may either be resiliently welded or riveted to the tank 52 and the outer wing section 28. In mounting and installing the tip tank assembly 50 to the outer wing section 28, care must be taken to avoid any interference with the control surfaces of the aircraft, such as the aileron 44. Lastly, the fuel drain extension 58 must be interfaced with the existing fuel drain system on the outer wing section 28. The fuel drain extension 58 is attached to the existing fuel drain system at an upper portion of the tank 52 entering through or above the inner end plate. The fuel drain extension 58 extends in a rearward and slightly downward direction within the fairing assembly as depicted in FIG. 4B. Eventually the fuel drain extension 58 exits the fairing assembly via a drain outlet 60 through the end of the conical tail piece 66 or, alternatively, the flat tapered tail piece 68. It should also be noted that the conical tail piece 66, as well as the flat tapered tail piece 68 are removable from the central piece 64 (FIG. 2C) and the inner end plate. This allows access to the removable end cap 54 and to the internal portions of the tank 52 for periodic maintenance.

Lastly, with reference to FIGS. 5B and 5C, a cross sectional view of the tip tank assembly 50 as installed on the outer wing section 28 is shown. As described previously, the wing tip is removed before the tip tank assembly 50 may be mounted and fastened via the mounting brackets 56 to the distal end 32 of the outer wing section 28. As illustrated in FIGS. 5B and 5C, the tip tank assembly 50 entirely replaces the wing tip coming into very close proximity, yet not interfering with the aileron 44. In addition, the tip tank assembly 50 must be located along an longitudinal direction of the aircraft that is appropriate to maintain the proper center of gravity of the aircraft. Typically the center of gravity of an aircraft is present along the same longitudinal location as the overall center of lift. This location tends to be near to the longitudinal location of the main wing assembly. Before the final location of the tip tank assemblies can be determined, the center of gravity of the aircraft must be determined and the tanks should be located within the stable envelope as determined by the manufacturer of the aircraft. As such, the weight and balance and center of gravity considerations must be evaluated for the particular type and model of aircraft that the tip tank assembly 50 would be installed onto.

In the present embodiment, as shown in FIG. 5B, the tip tank assembly 50 is oriented in an longitudinal direction well ahead of the forward surface or trailing edge 34 of the port side outer wing section 28. In addition, it should be noted that the upper closeout piece 72, as shown in FIG. 5C, is generally level as between the upper surface 38 of the outer wing section 28 and the upper part of the tip tank assembly 50. Since the upper closeout piece 72 is level with the upper part of the tip tank assembly, the wing span of the aircraft is effectively increased and drag is further reduced. Also, as illustrated in FIG. 5C, the inner end plate 70 is generally perpendicular to the lower surface 40 of the outer wing section 28 and initially extends in a downward direction. As discussed previously, the perpendicular orientation of the inner end plate 70 is in part responsible for reducing wing tip vortices and associated high pressure losses from the bottom of the wing. Eventually, the inner end plate 70 forms a rounded 90° bend extending in an outward direction and transitioning into a bottom portion of the central piece 64. Similarly, a forward portion of the inner end plate 70 transitions smoothly into the nose piece. This is done to ensure a smooth aerodynamic transition as airflow encounters the inner end plate.

It should be noted that the outer contours of the fairing assembly form an aerodynamic surface. Also, as shown in FIG. 5B, the horizontal cross section of the tip tank assembly 50 illustrates that the aerodynamic surface along an outer half cross section portion 74 has substantially more curvature than an inner half cross section portion 76. Therefore it can be said that the outer and inner half cross section portions 74,76 of the aerodynamic surface are not symmetrical about a centerline of the tip tank assembly 50. This asymmetrical design plays an additional role in trapping high pressure airflow beneath the lower surface of the wing and thus creating additional lift for the wing. Furthermore, the upper close out piece and the upper surface of the tip tank assembly may be curved in the same general direction of the wing airfoil. By curving the upper surface of the tip tank assembly even more lift can be generated.

Lastly, it should be appreciated that the individual components of the tip tank assembly can be integrally formed or made up of a one-piece assembly. Depending on the container application of the tip tank, the tank components and fairing assembly may be formed out of high strength composites including fiberglass, carbon fiber, plastic, or even various metal alloys including aluminum, steel, and or titanium. A one-piece construction using a high strength and lightweight material would provide the additional advantages of reducing the weight of the aircraft and improve the aerodynamic characteristics by seamlessly blending the individual components of the tip tank assembly.

Modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A wing tip tank assembly for installation on a wing portion of an aircraft at a distal end of the wing portion, including:
   a forward tip portion, an aft tip portion, and a cylindrical portion with the forward tip portion in the general direction of a forward portion of the aircraft and the aft tip portion in the general direction of an aft portion of the aircraft, wherein an upper surface of the wing tip tank assembly is generally level with an upper surface of the wing portion;
   an end plate fairing disposed along an exterior, inboard side of the wing tip tank assembly and depending from the lower surface of the wing portion and extend toward a lower surface of the wing tip tank assembly, wherein the end plate fairing includes a generally planar surface adapted to extend from the lower surface of wing portion and generally perpendicular to the lower surface of the wing portion;
   a closeout fairing adapted to extend from the upper surface of the wing portion toward the upper surface of the wing tip tank assembly;
   a nose cone extending forward from the forward tip portion of the wing tip tank assembly; and
   a first tail cone extending aft from the aft tip portion of the wing tip tank assembly.

2. The aircraft set forth in claim 1 wherein the wing tip tank assembly is adapted to retain and supply aircraft fuel to at least one propulsion unit associated with the aircraft.

3. A tip tank assembly mounted to a distal end of a wing of an aircraft, the wing having an upper surface and a lower surface, the aircraft having a longitudinal axis extending from a forward portion to an aft portion, the tip tank assembly comprising:
- a central piece including a first end, a second end, an inner side portion, and an outer side portion;
- a nose piece disposed at the first end of the central piece;
- a tail piece disposed at the second end of the central piece; and
- an inner end plate piece extending perpendicularly downward from the lower surface of the wing and adjacent the exterior of the inner side portion of the central piece and inboard facing;
- wherein the nose piece, the tail piece, the inner end plate piece, and the outer side portion of the central piece form an aerodynamic surface and the inner end plate piece forms a fairing surface.

4. The tip tank assembly set forth in claim 3, wherein the inner end plate piece extends generally linearly from a forward portion of the wing to an aft portion of the wing.

5. The tip tank assembly set forth in claim 3, wherein the tank for carrying fuel is disposed within a volumetric space defined by the aerodynamic surface.

6. The tip tank assembly set forth in claim 3, further including an upper closeout piece disposed between and adjacent the upper surface of the wing and an upper portion of the central piece.

7. The tip tank assembly set forth in claim 6, wherein the upper closeout piece and an upper portion of the central piece are curved in the same direction as the upper surface of the wing.

8. The tank tip assembly set forth in claim 3, further including a flat tapered tail piece disposed on the tail piece.

9. The tip tank assembly set forth in claim 8, wherein the flat tapered tail piece includes a flat inner vertical surface lying in a vertical plane of the inner end plate piece and abutting a rear portion of the inner end plate piece.

10. The tip tank assembly set forth in claim 3, wherein a cross section along a horizontal plane of the aerodynamic surface is non-symmetrical about its longitudinal axis.

11. The tip tank assembly set forth in claim 10, wherein the cross section of the aerodynamic surface includes a curved outer side portion.

* * * * *